(12) United States Patent
Meine

(10) Patent No.: US 12,068,715 B2
(45) Date of Patent: Aug. 20, 2024

(54) SEALABLE MOUNTING SYSTEM WITH A SLIDABLE COMPONENT MOUNT

(71) Applicant: Unirac Inc., Albuquerque, NM (US)

(72) Inventor: Shawn Meine, Phoenix, AZ (US)

(73) Assignee: Unirac Inc., Albuquerque, NM (US)

(*) Notice: Subject to any disclaimer, the term of this patent is extended or adjusted under 35 U.S.C. 154(b) by 0 days.

(21) Appl. No.: 17/732,137

(22) Filed: Apr. 28, 2022

(65) Prior Publication Data

US 2022/0352848 A1 Nov. 3, 2022

Related U.S. Application Data

(60) Provisional application No. 63/180,745, filed on Apr. 28, 2021.

(51) Int. Cl.
*H02S 20/23* (2014.01)
*F16M 13/02* (2006.01)
*H02S 30/10* (2014.01)

(52) U.S. Cl.
CPC ............ *H02S 20/23* (2014.12); *F16M 13/02* (2013.01); *H02S 30/10* (2014.12)

(58) Field of Classification Search
CPC .......... F16M 13/02; H02S 30/10; H02S 20/23
See application file for complete search history.

(56) References Cited

U.S. PATENT DOCUMENTS

| | | |
|---|---|---|
| D230,348 S | 2/1974 | Sabel |
| D482,597 S | 11/2003 | Brass et al. |
| D547,262 S | 7/2007 | Ullman |
| 7,866,099 B2 | 1/2011 | Komamine et al. |
| 8,424,821 B2 | 4/2013 | Liu |
| 8,869,471 B2 | 10/2014 | Wildes et al. |
| 8,938,932 B1 | 1/2015 | Wentworth et al. |
| D727,395 S | 4/2015 | Choi et al. |
| 9,496,820 B2 * | 11/2016 | Seery ...................... F24S 25/61 |
| 9,755,571 B2 * | 9/2017 | Almy ..................... H02S 20/23 |
| 9,825,581 B2 | 11/2017 | Wildes |
| 9,893,677 B1 * | 2/2018 | Liu ......................... H02S 20/23 |
| 9,906,188 B2 * | 2/2018 | Almy ..................... H02S 20/30 |
| D843,932 S | 3/2019 | Sinai et al. |
| 10,432,136 B2 | 10/2019 | Lu |
| 10,663,195 B2 * | 5/2020 | Ash ........................ H02S 20/23 |
| 10,767,684 B1 | 9/2020 | Meine et al. |

(Continued)

OTHER PUBLICATIONS

Office Action for U.S. Appl. No. 18/134,962, mailed on Nov. 8, 2023, Meine, "Structural Attachment Sealing System", 9 pages.

(Continued)

*Primary Examiner* — Eret C McNichols
(74) *Attorney, Agent, or Firm* — Lee & Hayes, P.C.

(57) ABSTRACT

A mounting system including a base, a cavity with the base and open to a bottom portion of the base. A port extends from a top of the base into the cavity, and a vent is disposed in the top of the base and extends to the cavity. The port being configured to receive an injected sealant to fill the cavity with the injected sealant, thereby sealing around a penetration in a surface by a surface fastener. The injected sealant forcing air from inside the cavity out of the vent to ensure the injected sealant completely fills the cavity. A slide attached on the base protrudes above the top portion of the base and includes one or more guide rails for slidably receiving a bracket.

19 Claims, 8 Drawing Sheets

(56) References Cited

U.S. PATENT DOCUMENTS

| | | | |
|---|---|---|---|
| D909,853 S | 2/2021 | Jasmin | |
| 10,982,430 B2 * | 4/2021 | Meine | F16B 43/001 |
| 11,152,889 B1 | 10/2021 | Affentranger, Jr. et al. | |
| 11,463,040 B2 * | 10/2022 | Affentranger, Jr. | F24S 25/30 |
| 11,486,133 B2 | 11/2022 | Meine | |
| 11,486,134 B2 * | 11/2022 | Meine | F24S 10/00 |
| 11,515,831 B2 | 11/2022 | Affentranger, Jr. et al. | |
| D987,412 S | 5/2023 | Meine | |
| 2011/0120047 A1 | 5/2011 | Stearns et al. | |
| 2012/0073220 A1 | 3/2012 | Kobayashi et al. | |
| 2012/0234378 A1 | 9/2012 | West et al. | |
| 2012/0298817 A1 | 11/2012 | West et al. | |
| 2013/0133270 A1 | 5/2013 | West et al. | |
| 2013/0276867 A1 | 10/2013 | Wildes et al. | |
| 2014/0175244 A1 | 6/2014 | West et al. | |
| 2015/0270802 A1 | 9/2015 | Schaefer et al. | |
| 2016/0226435 A1 | 8/2016 | Almy et al. | |
| 2016/0268958 A1 | 9/2016 | Wildes et al. | |
| 2017/0194902 A1 | 7/2017 | Meine et al. | |
| 2017/0201207 A1 | 7/2017 | Hudson | |
| 2019/0081587 A1 * | 3/2019 | Mayfield | F24S 25/636 |
| 2019/0093340 A1 | 3/2019 | Meine | |
| 2020/0378110 A1 * | 12/2020 | Meine | F16B 33/004 |
| 2021/0285596 A1 * | 9/2021 | Affentranger, Jr. | F16M 13/02 |
| 2023/0250629 A1 | 8/2023 | Meine | |

OTHER PUBLICATIONS

Office Action for U.S. Appl. No. 17/977,865, mailed on Sep. 7, 2023, Meine, "Structural Attachment Sealing System", 16 Pages.
Office Action for U.S. Appl. No. 17/977,943, mailed on Sep. 7, 2023, Meine, "Structural Attachment Sealing System", 20 pages.

* cited by examiner

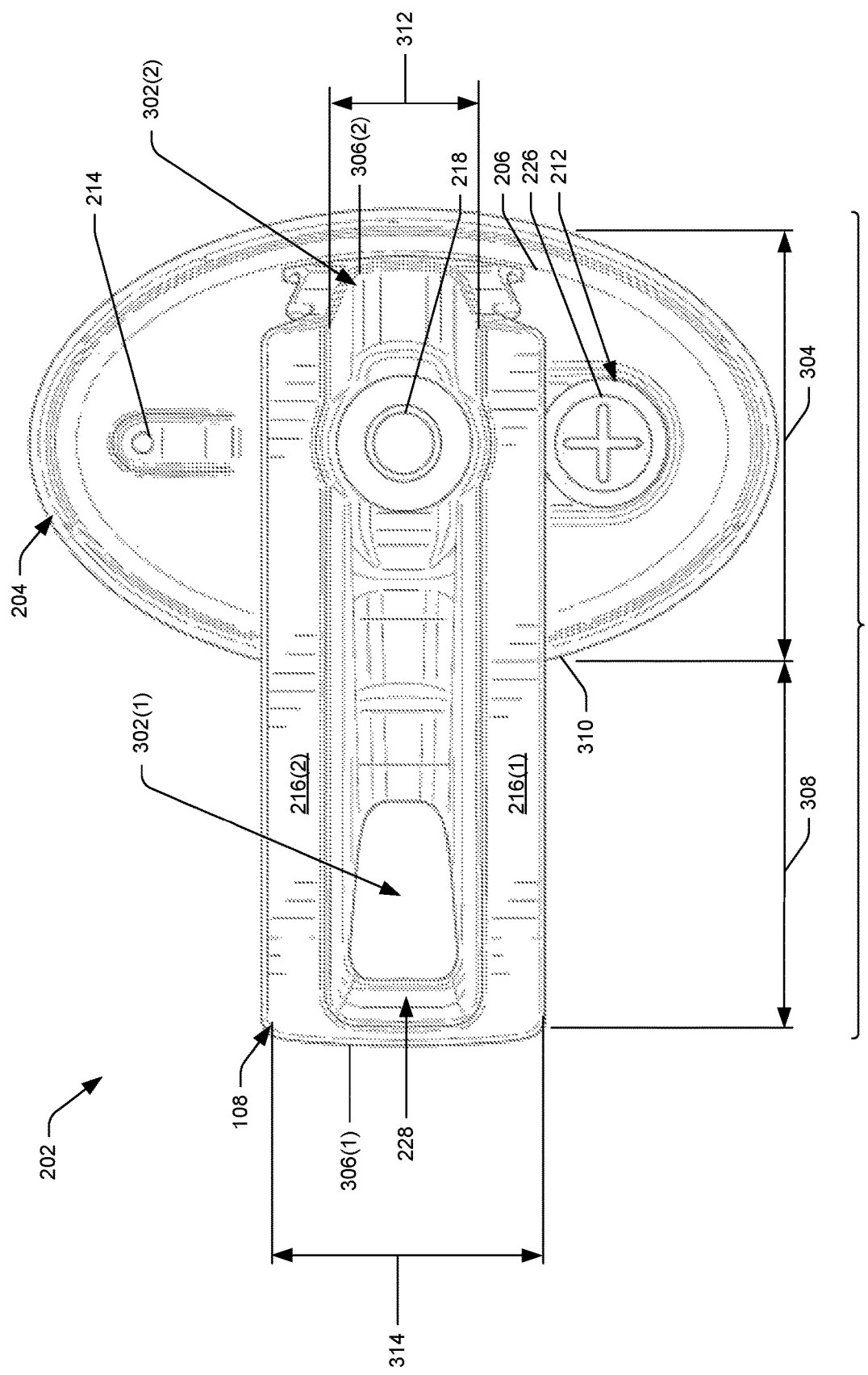

SEALABLE MOUNTING SYSTEM WITH A SLIDABLE COMPONENT MOUNT

BACKGROUND

As the solar energy industry continues to grow, the equipment to mount photovoltaic (PV) modules on different types of structures and/or locations continues to adapt and improve as well. Conventional PV module mounting assemblies are frequently designed with a specific use according to a particular surface structure. As such, conventional mounting assemblies frequently lack the ability to be implemented on multiple different structures and/or locations.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 3A illustrates a top view of the mounting system shown in FIG. 2, according to an embodiment of this disclosure.

DETAILED DESCRIPTION

Overview

This disclosure is directed to solar panel mounting systems. In particular, this disclosure is directed to a surface mounted system that provides a sealing feature to seal the penetration on the surface and simultaneously provide a slider that allows for a variety of components to be positionally adjusted when attached thereto, including, for example: a trim skirt mount for mounting a skirt, and/or a micro rail mount for mounting additional componentry. It is further directed to other newly conceived compatible components that are configured to attach to the slider, as disclosed herein. Thus, for the sake of convenience, hereinafter, when referring generically to any component that is configured to attach directly to the slider, such components may be referred to as mounting attachments, as the specific attachment may vary. Nevertheless, some mounting attachments are discussed herein with a more specific name (e.g., bracket, bracket assembly, clamp assembly).

An embodiment of a mounting system, according to the disclosure, may include a base portion for mounting to a surface (e.g., roof) and a slide portion for slidably receiving a mounting attachment.

The base portion includes a cavity for receiving a sealant to provide a permanent airtight and watertight seal between the base portion and the surface. The base portion may further include a port configured to receive an injection of the sealant to fill the cavity and a vent to allow air to exit the cavity, when the sealant is injected, to ensure the sealant completely fills the cavity. Thus, a user may quickly and easily install solar panels to the surface without the need to remove nails, cut shingles, or add standard flashings or assemblies, etc. Such benefits may reduce the overall cost and time to install the solar panels. Nevertheless, a flashing may be utilized as desired.

The slide portion is disposed on the base portion, protruding upward from a top surface of the base portion. The slide portion may include one or more guide rails for slidably receiving a mounting attachment. In an embodiment, the slide portion may have a through-hole disposed between the one or more guide rails to accommodate a fastener to secure the slider with the base portion against the surface.

Illustrative Solar Panel Mounting Systems

Figure 1:
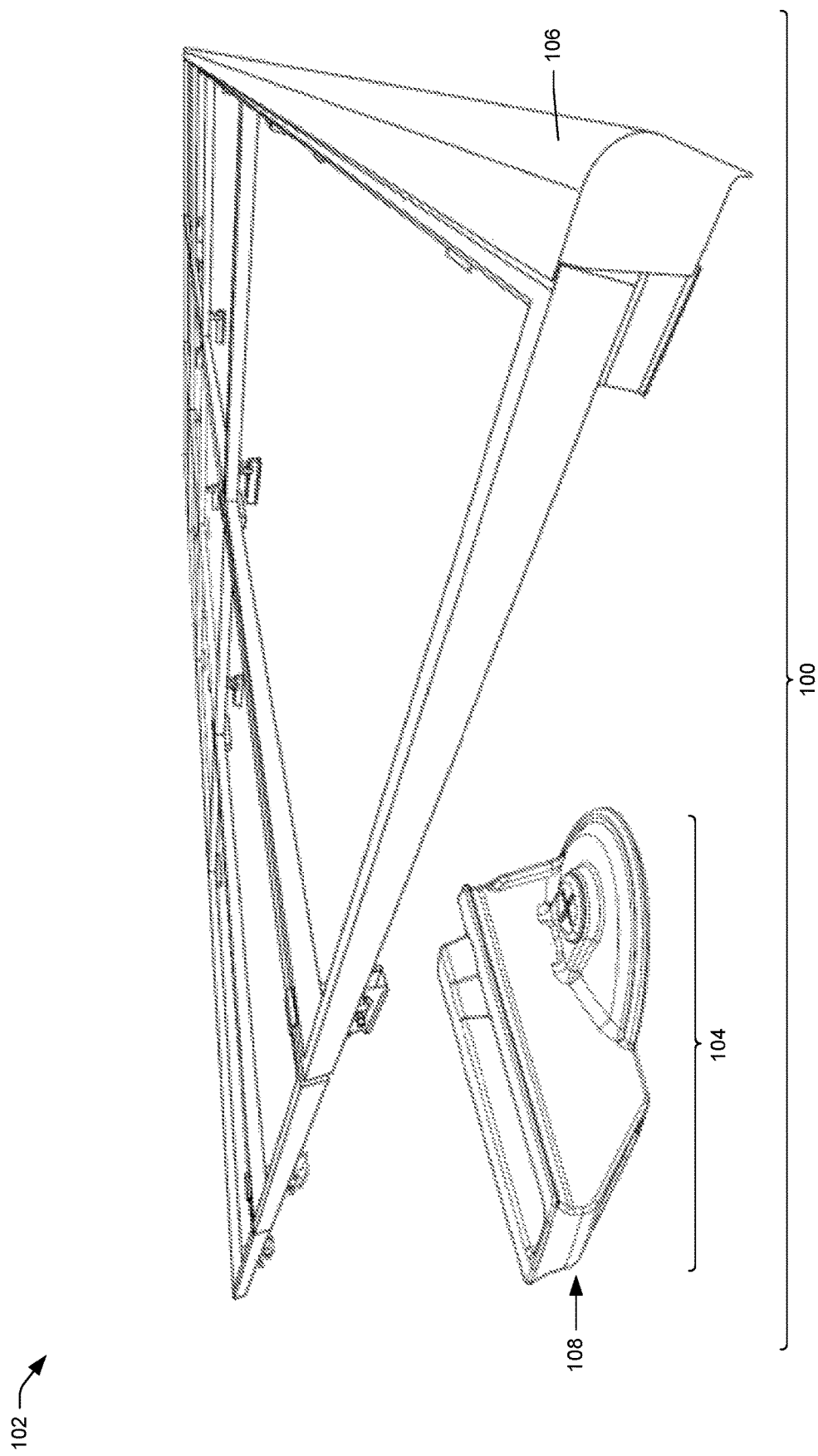
FIG. 1 illustrates a top perspective view of an example solar panel assembly including an example mounting system for coupling the solar mounting assembly to a roof or other surface, according to an embodiment of this disclosure.

FIG. 1 illustrates a top perspective view 100 of an example solar panel assembly 102. The solar panel assembly 102 may be attached to a roof via at least one mounting system, such as mounting system 104. Structural components of any given solar panel assembly may vary. That is, the various structural components of a solar panel assembly may have vary depending on the needs of the user. For example, one structural component of the solar panel assembly 102 depicted in FIG. 1 is a skirt 106 disposed on an outside perimeter of the thereof, while another structural component may be a rail (not shown) which may be mounted on another different member of the solar panel assembly 102. As such, the mounting system 104 may include a slide portion 108 that slidably receives a mounting attachment of the solar panel assembly 102. For example, the slide portion 108 may slidably receive a first mounting attachment (not shown) to mount to the skirt 106. In another example, the slide portion 108 may slidably receive a second different mounting attachment (not shown) to mount to a rail. Therefore, the mounting system 104 as described herein facilitates a user (e.g., an installer, a technician, etc.) to quickly and easily install the solar panel assembly 102.

Figure 2:
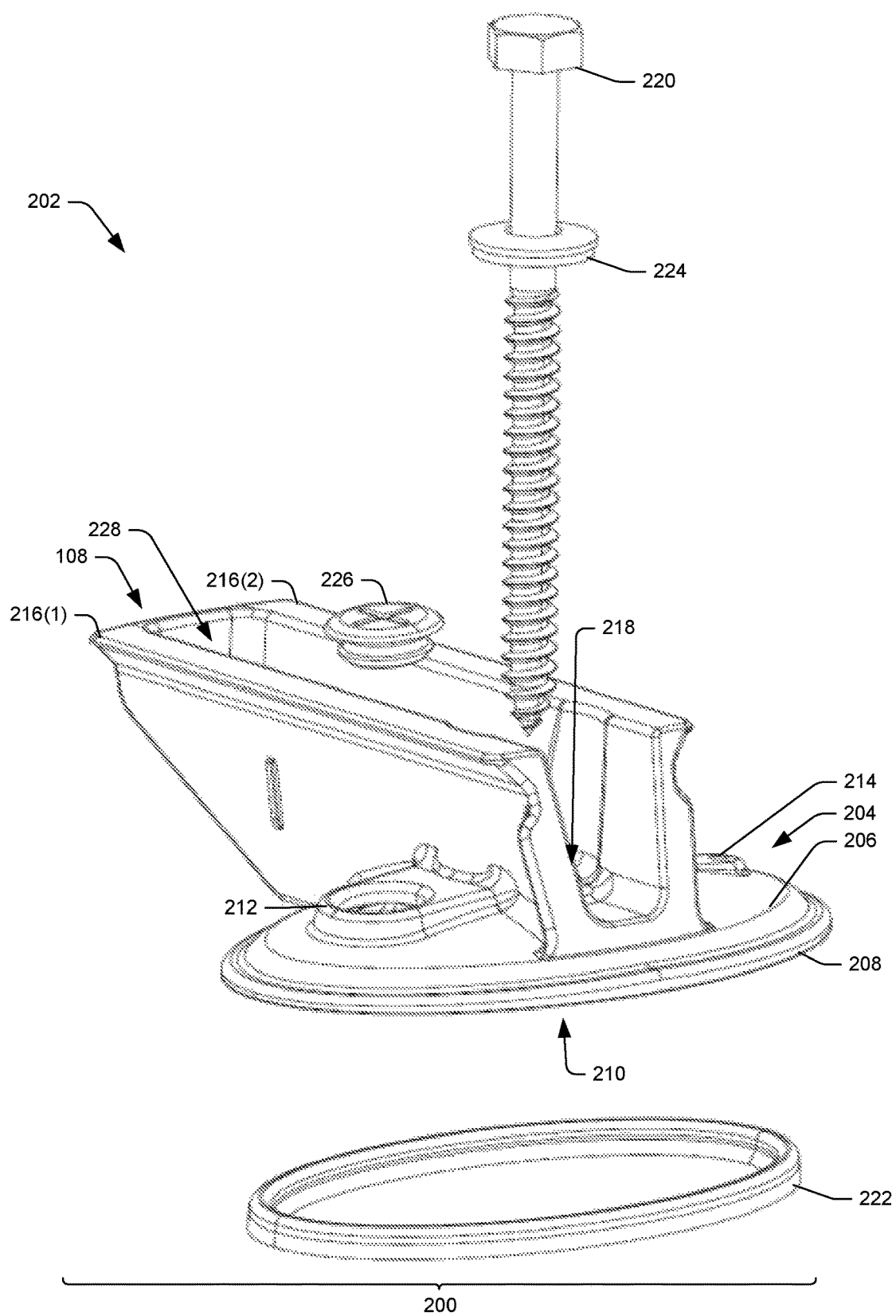
FIG. 2 illustrates an exploded assembly view of the mounting system shown in FIG. 1, according to an embodiment of this disclosure.

FIG. 2 illustrates an exploded assembly view 200 of a mounting system 202, which may be similar to the mounting system 104 in FIG. 1. Inasmuch as other components of the mounting system 202 are similar to those of the mounting system 104, the reference numbers remain the same on the same parts for convenience. The mounting system 202 is shown including a base portion 204 having a top portion 206 opposite a bottom portion 208. The top portion 206 may correspond to a top surface. The bottom portion 208 may correspond to a bottom surface. The base portion 204 may include a cavity 210 that is open to the bottom portion 208 of the base portion 204. The base portion 204 may include a port 212 extending through the top portion 206 of the base portion 204 into the cavity 210 within the base portion 204. The port 212 extending through a thickness of the base portion 204 and being fluidly connected to the cavity 210. The base portion 204 may include a vent 214 disposed in the top portion 206 of the base portion 204 and extending to the cavity 210 within the base portion 204. The vent 214 extending through a thickness of the base portion 204 and being fluidly connected to the cavity 210. The port 212 and/or the vent 214 may be flush (not shown) with the surface of the top portion 206 or may be defined in part by a wall, respectively, that rises (as shown) from the surface of the top portion 206.

FIG. 2 illustrates the slide portion 108 disposed on the base portion 204 so as to protrude above the top portion 206 of the base portion 204. In an embodiment, the slide portion 108 may be formed integrally with the base portion 204 (e.g., injection molded, casted, etc.). While FIG. 2 illustrates the slide portion 108 being formed integrally with the base portion 204, the slide portion 108 may not be formed integrally with the base portion 204, vice versa. For example, the slide portion 108 may be formed separately, as a separate unit, from the base portion 204, and thereafter, may be coupled to the base portion 204. The slide portion 108 may include one or more guide rails 216(1) and 216(2) for slidably receiving a mounting attachment (not shown). For example, the one or more guide rails 216(1) and 216(2) of the slide portion 108 may provide for slidably receiving cooperating slide grooves of a mounting attachment. While FIG. 2 illustrates the slide portion 108 including one or more guide rails 216(1) and 216(2) for slidably receiving a mounting attachment, the slide portion 108 may include grooves, notches, pockets, slots, etc. for slidably receiving cooperating rails, protrusions, ledges, etc. of a mounting attachment. For example, the one or more guide rails 216(1) and 216(2) may include flanges, lips, rim, and the like for engaging with a corresponding mechanism of the mounting attachment (e.g., slit, pocket, channel, etc.). Furthermore, although two of the one or more guide rails 216(1) and 216(2) are shown, more or less than two guide rails may be included. For example, a slide portion may have an upside down T-shaped profile (not shown) attached to the base portion 204. Where the vertical portion of the T-shaped profile is attached to the base portion 204 and the horizontal portion of the T-shaped profile comprises a single guide rail disposed at the top of the vertical portion of the T-shaped profile attached to the base portion 204. The one or more guide rails 216(1) and 216(2) spanning a longitudinal distance. The one or more guide rails 216(1) and 216(2) may be spaced apart by a lateral distance that is less than the longitudinal distance of the one or more guide rails 216(1) and 216(2).

The bottom portion 208 of the base portion 204 may be configured to be mounted on a surface (e.g., a roof) (not shown). The slide portion 108 may have a through-hole 218 disposed between the one or more guide rails 216(1) and 216(2) to accommodate a surface fastener 220 to secure the base portion 204 against the surface. While FIG. 2 illustrates the through-hole 218 disposed between the one or more guide rails 216(1) and 216(2) of the slide portion 108, the through-hole 218 may be disposed outside of the one or more guide rails 216(1) and 216(2) of the slide portion 108. For example, the through-hole 218 may be disposed in the base portion 204 on the left side of guide rail 216(1), on the right side of guide rail 216(2), behind the one or more guide rails 216(1) and 216(2), in front of the one or more guide rails 216(1) and 216(2), etc. Further, while FIG. 2 illustrates the mounting system 202 including one through-hole 218 to accommodate the surface fastener 220 to secure the base portion 204 against the surface, the mounting system 202 may include a plurality of through-holes to accommodate a plurality of surface fasteners to secure the base portion 204 against the surface.

The port 212 is configured to receive an injected sealant (not shown) to fill the cavity 210 with the injected sealant, thereby sealing around a penetration (not shown) in the surface created by the surface fastener 220. When the sealant is injected into the cavity 210, the injected sealant forces air from inside the cavity 210 out of the vent 214 to ensure the injected sealant completely fills the cavity 210.

The mounting system 202 may include a seal 222. The seal 222 may be an O-ring, a gasket, etc. to provide for sealing an interface between the bottom portion 208 of the base portion 204 and a surface to which the bottom portion 208 of the base portion 204 is mounted. The base portion 204 may have a curvilinear shape (e.g., circular, ovular, etc.). The seal 222 may have a curvilinear shape (e.g., circular, ovular, etc.). The surface fastener 220 may include a washer 224 (e.g., rubber washer, EDM washer, etc.) to provide for sealing the interface between the surface fastener 220 and the through-hole 218 disposed between the one or more guide rails 216(1) and 216(2). The mounting system 202 may include a plug 226 to seal the port 212. The mounting system 202 may include a plug (not shown) to seal the vent 214. The plug 226 may be threaded, press fit, snap fit, etc.

The mounting system 202 may include a channel 228 disposed between the one or more guide rails 216(1) and 216(2). The channel 228 being open at one end and closed at another end. The through-hole 218 being disposed internal to the channel 228, and when the surface fastener 220 couples thereto, it's disposed within the channel 228.

FIG. 3A illustrates a top view 300 of the mounting system 202 shown in FIG. 2. In FIG. 3A, the surface fastener 220 is shown removed. FIG. 3A illustrates the through-hole 218 disposed between the one or more guide rails 216(1) and 216(2), the plug 226 disposed in the port 212, and the vent 214. The port 212 may be disposed in the top portion 206 of the base portion 204 opposite the vent 214. For example, the port 212 may be disposed in the top portion 206 of the base portion 204 adjacent to guide rail 216(1) opposite the vent 214 disposed in the top portion 206 of the base portion 204 adjacent to guide rail 216(2). Because the port 212 may be disposed in the top portion 206 of the base portion 204 opposite the vent 214, a force from a sealant dispenser gun (not shown) injecting sealant into the port 212 increases a pressure inside the cavity 210, forcing all the air out through the vent 214 opposite the port 212. Ideally, with minor variance, the sealant completely fills all the voids inside the cavity 210, including around a surface penetration of the surface fastener 220, and displaces the air out of the cavity 210 when the mounting system 202 is fastened over the surface penetration of the surface fastener 220. The vent 214, the port 212, and/or the through-hole 218 may be aligned along an axis.

The mounting system 202 may include one or more drain openings 302(1) and 302(2) disposed in opposite ends of the channel 228 of the slide portion 108 to prevent moisture from collecting within channel 228 of the slide portion 108. The one or more drain openings 302(1) and 302(2) may be disposed in opposite ends of the channel 228 between the one or more guide rails 216(1) and 216(2). While FIG. 3A illustrates the one or more drain openings 302(1) and 302(2) disposed in opposite ends of channel 228 of the slide portion 108 to prevent moisture from collecting in the channel 228, the one or more drain openings 302(1) and 302(2) may be disposed in opposite sides of the slide portion 108. For example, one or more drain openings may be disposed in bottom portions of vertical sidewalls of the one or more guide rails 216(1) and 216(2) to prevent moisture from collecting in the slide portion 108. The first opening 302(1) may be disposed on a first side of the through-hole 218, and the second opening 302(2) may be disposed on a second side of the through-hole 218. The through-hole 218 may be set above a base of the slide portion 108, such that water sheds away from the through-hole 218 towards the first and second openings 302(1) and 302(2). In this way, water may cascade towards the first and second openings 302(1) and 302(2), rather than entering the through-hole 218. Moreover, one or more sloped surfaces extending from the through-hole 218 may provide for shedding water from the through-hole 218 toward the first and/or second openings 302(1) and/or 302(2). The channel 228 may have a width 312 that is less than a width 314 of the slide portion 108.

The slide portion 108 is shown being shaped to span across (or substantially across) a width direction 304 of the base portion 204 and extend from the top portion 206 of the base portion 204. The slide portion 108 may be shaped to span across the width direction 304 of the base portion 204 at a location in between the port 212 and the vent 214. The slide portion 108 may have a first end 306(1) opposite a second end 306(2). The first end 306(1) may extend a distance 308 out past an outside edge 310 of the base portion 204, and in a direction away from the base portion 204. The second end 306(2) may be disposed directly on the base portion so as to extend from the top portion of the base portion 204 adjacent to the outside edge 310 of the base portion 204. As discussed above, the drain opening 302(1) may be disposed in or proximate to the first end 306(1) and the drain opening 302(2) may be disposed in or proximate to the second end 306(2).

Figure 3B:
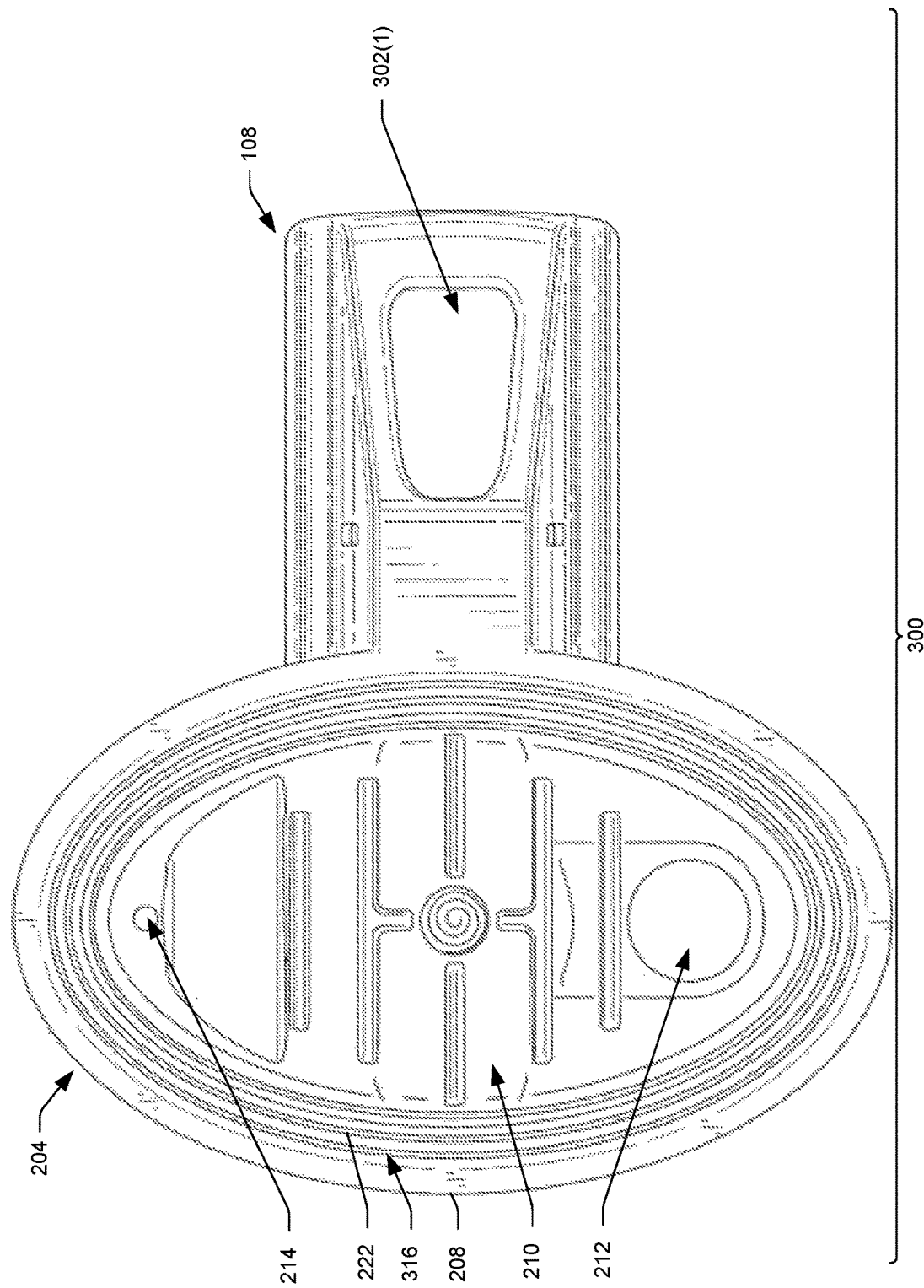
FIG. 3B illustrates a bottom view of the mounting system shown in FIG. 2, according to an embodiment of this disclosure.

FIG. 3B illustrates the cavity 210 disposed within the base portion 204 that is open to the bottom portion 208 of the base portion 204, opposite the top portion 206. As introduced above, the cavity 210 is shaped, sized, and configured to receive the sealant. The bottom portion 208 of the base portion 204 may include a groove 316. The groove 316 to provide an interface, or seat, for receiving a portion of the seal 222. For example, the bottom portion 208 of the base portion 204 may include a captive groove (e.g., an O-ring groove, a gasket groove, etc.) to provide for retaining the seal 222 in place in the base portion 204. The port 212 and the vent 214 extend through the base portion 204, between the top portion 206 and the bottom portion 208.

Figure 4:
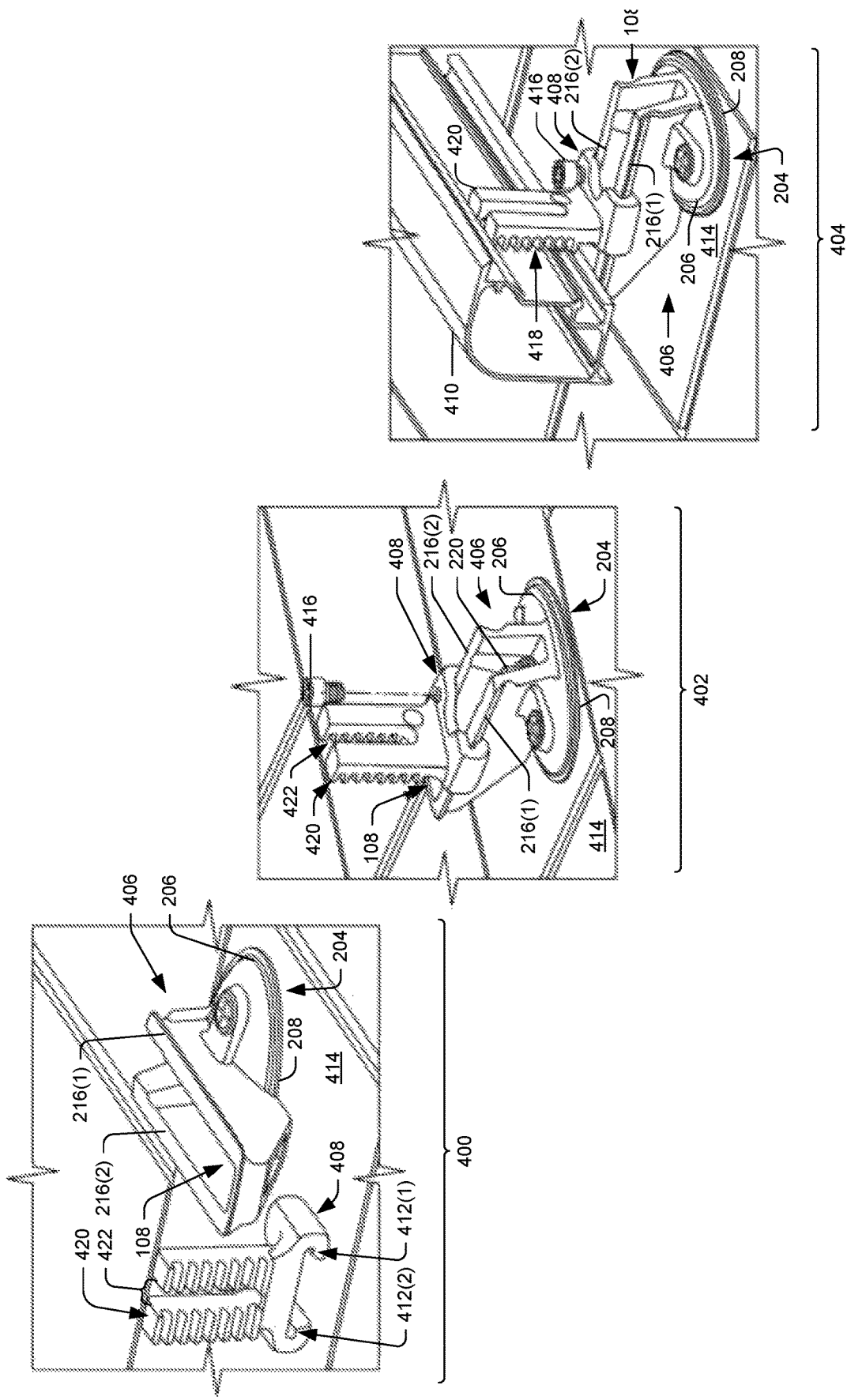
FIG. 4 illustrates a first perspective view, a second perspective view, and a third perspective view of an example bracket configured to be implemented with the mounting system shown in FIG. 1, according to an embodiment of this disclosure.

FIG. 4 illustrates a first perspective view 400, a second perspective view 402, and a third perspective view 404 of a mounting system 406 including a bracket 408. The mounting system 406 may be similar to the mounting system 104 in FIG. 1 or the mounting system 202 in FIG. 2. Inasmuch as other components of the mounting system 406 are similar to those of mounting systems 104 or 202, respectively, the reference numbers remain the same on the same parts for convenience. Here in this embodiment, the bracket 408 may be a trim skirt mount for attaching a skirt 410 (illustrated in the third perspective view 404). The skirt 410 may be the same as skirt 106 illustrated in FIG. 1.

The first perspective view 400 illustrates that the bracket 408 may include cooperating slide grooves 412(1) and 412(2) for slidably receiving the one or more guide rails 216(1) and 216(2) of the slide portion 108, respectively. The grooves 412(1) and 412(2) may be disposed at a bottom portion of the stanchion 420 of the bracket 408. The grooves 412(1) and 412(2) may include pockets that are sized and configured to slide over, and onto the rails 216(1) and 216(2) of the slide portion 108. The grooves 412(1) and 412(2) may slide onto the first end or the send end of the slide portion 108. The bracket 408 may be slidably attached to the one or more guide rails 216(1) and 216(2) of the slide portion 108 subsequent to the mounting of the bottom portion 208 of the mounting system 406 to a surface 414. For example, the bracket 408 may be slidably attached to the one or more guide rails 216(1) and 216(2) of the slide portion 108 subsequent to the surface fastener 220 securing the base 204 to the surface 414 and/or the injected sealant completely fills the cavity.

The second perspective view 402 illustrates the bracket 408 may include a set screw 416. The third perspective view 404 illustrates the set screw 416 may secure the bracket 408 to the slide portion 108. The bracket 408 may include a through-hole (e.g., a threaded through-hole) that receives the set screw 416, once moved into position, the set screw 416 is tightened to engage the guide rail 216(1) and/or 216(2). Although only one set screw 416 is included, more than one set screw may be included. The set screw 416 may engage with a top surface of the guide rail 216(1) and/or 216(2) as the set screw 416 is tightened such that the set screw 416 is biased against the top surface of the guide rail 216(1) and/or 216(2). When the set screw 416 is tightened and biased against the top surface of the guide rail 216(1) and/or 216(2), the grooves 412(1) and 412(2) are configured to at least partially wrap around the one or more guide rails 216(1) and 216(2) and engage the guide rail 216(1) and 216(2) at, for example, a bottom surface of the one or more guide rails 216(1) and 216(2).

The third perspective view 404 illustrates that the bracket 408 may include a plurality of notches 418 for attaching to the skirt 410. The bracket 408 may include a stanchion 420 extending from the one or more cooperating slide grooves 412(1) and 412(2). The stanchion 420 may extend in a direction that is transverse to the slide grooves 412(1) and 412(2), such that the stanchion 420 extends vertically above the mounting system 406. The stanchion 420 is shown including a slot 422 configured to slidably receive a fastener (e.g., a T-bolt) (not shown) and a nut (not shown) for securing a rail segment to the bracket 408 such that the fastener is securable at a desired location within the slot 422. The plurality of notches 418 may disposed along the stanchion 420 to provide for attaching to the skirt 410 at a desired location along the stanchion 420. The stanchion 420 may include one or more posts 420(1) and 420(2). The slot 422 may be disposed therebetween.

The bracket 408 may be secured at a desired location along the one or more guide rails 216(1) and 216(2). For example, the bracket 408 may be slidably attached to the one or more guide rails 216(1) and 216(2) at a desired location and fixed at the desired location on the one or more guide rails 216(1) and 216(2) via the set screw 416. The skirt 410 may be attached to the stanchion 420 via the plurality of notches 418 at a desired location. The skirt 410 may be attached to the stanchion 420 subsequent to the bracket 408 being slidably attached to the one or more guide rails 216(1) and 216(2). The skirt 410 may be attached to the stanchion 420 prior to the bracket 408 being slidably attached to the one or more guide rails 216(1) and 216(2). While FIG. 4 illustrates the bracket 408 being a single integrally formed unit, the bracket 408 may not be a single integrally formed unit. For example, the stanchion 420 may be a separate integrally formed unit that is attachable to the one or more cooperating slide grooves 412(1) and 412(2) formed of another separate integrally formed unit(s).

Figure 5:
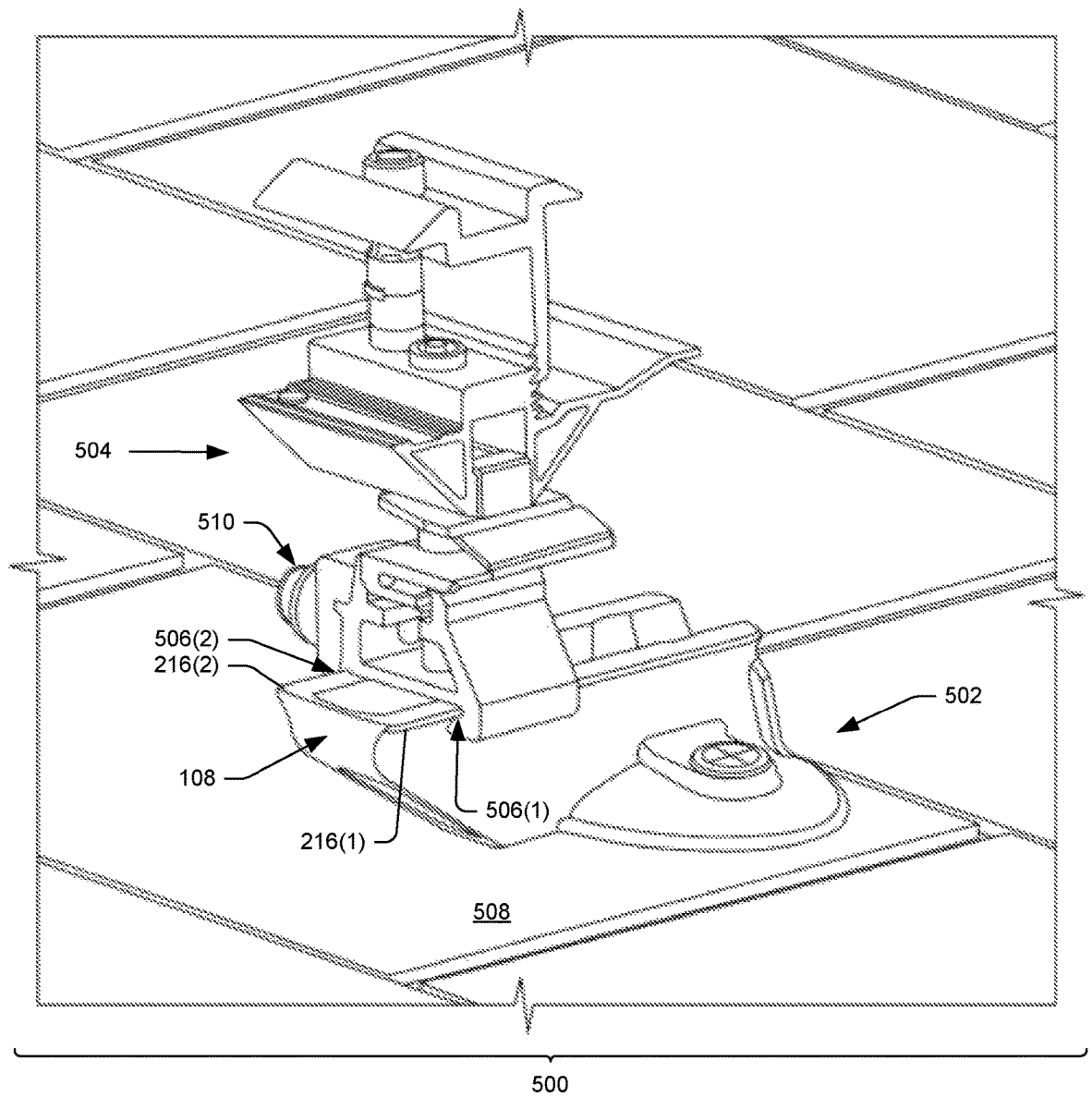
FIG. 5 illustrates a perspective view of an example clamp assembly configured to be implemented with the mounting system shown in FIG. 1, according to an embodiment of this disclosure.

FIG. 5 illustrates a perspective view 500 of a mounting system 502 including a clamp assembly 504. The mounting system 502 may be similar to the mounting system 104 in FIG. 1, the mounting system 202 in FIG. 2, and/or the mounting system 406 in FIG. 4. Inasmuch as other components of the mounting system 502 are similar to those of mounting systems 104, 202, and/or 406 the reference numbers remain the same on the same parts for convenience. Here in this embodiment, the clamp assembly 504 may be a 2-inch micro rail bracket or an 8-inch micro rail bracket for attaching to a solar panel (not shown).

The clamp assembly 504 may include one or more cooperating slide grooves 506(1) and 506(2) for slidably receiving the one or more guide rails 216(1) and 216(2) of the slide portion 108. The one or more cooperating slide grooves 506(1) and 506(2) may be the same as the one or more cooperating slide grooves 412(1) and 412(2). The clamp assembly 504 may be slidably attached to the one or more guide rails 216(1) and 216(2) of the slide portion 108 subsequent to the mounting of the bottom portion 208 of the mounting system 502 to a surface 508. The clamp assembly 504 may include a clamping mechanism 510 for securing the clamp assembly 504 to the slide portion 108. For example, subsequent to the clamp assembly 504 being positioned at a desired location along the one or more guide rails 216(1) and 216(2) of the slide portion 108 a fastener of the clamping mechanism 510 may be tightened to clamp the two slide grooves 506(1) and 506(2) onto the first and second guide rails 216(1) and 216(2) of the slide portion 108. The clamp assembly 504 may be configured to receive a portion of a solar module different from the mounting bracket 408 configured to attach to a skirt 410.

Figure 6:
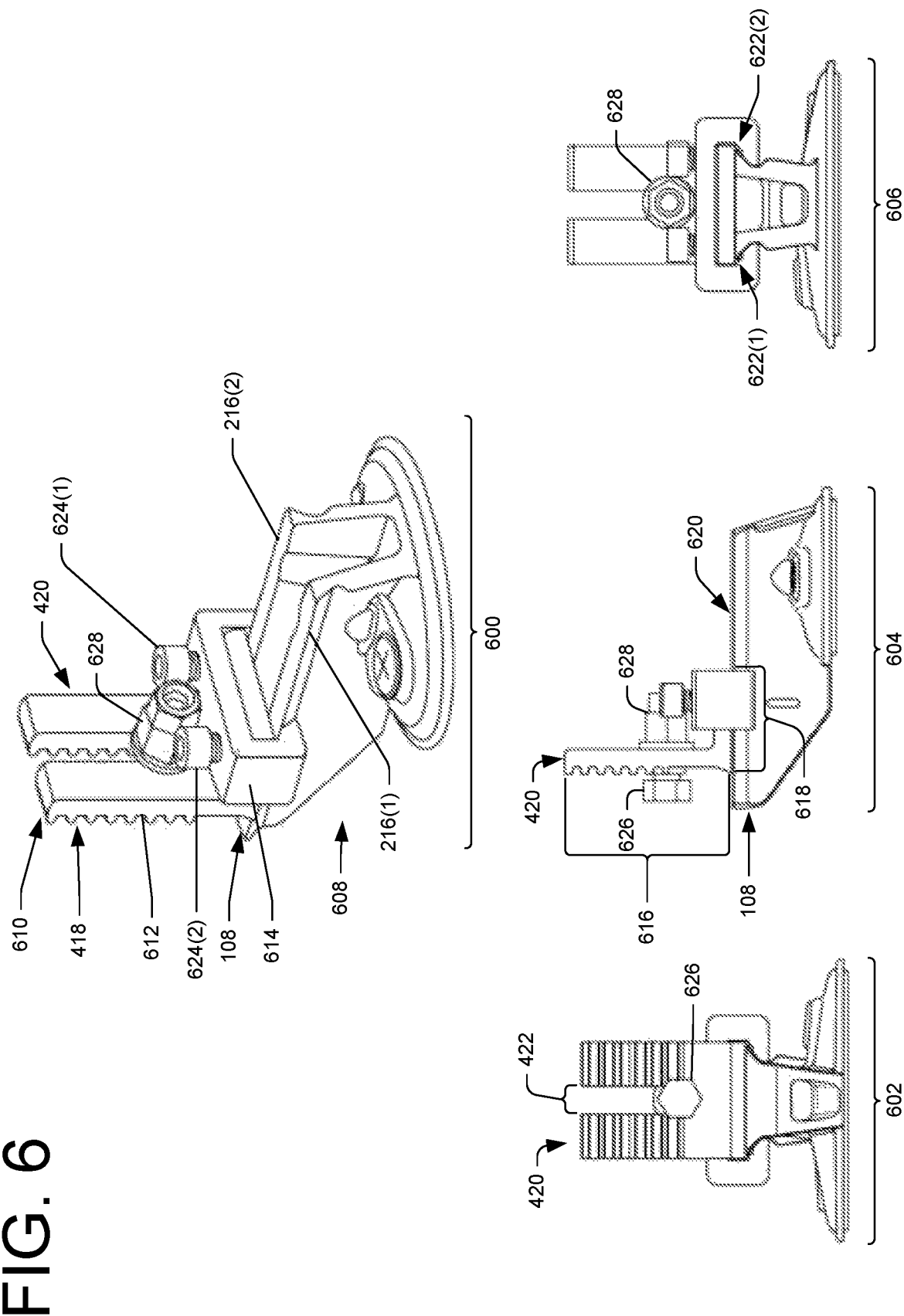
FIG. 6 illustrates a perspective view, a rear view, a side view, and a front view of an example bracket assembly configured to be implemented with the mounting system shown in FIG. 1, according to an embodiment of this disclosure.

FIG. 6 illustrates multiple views, including a perspective view 600, a rear view 602, a side view 604, and a front view 606 (in order from top to bottom, left to right), of another embodiment of a mounting system 608 according to the instant disclosure including a mounting bracket 610.

The mounting system 608 may be similar to the mounting system 104 in FIG. 1, the mounting system 202 in FIG. 2, the mounting system 406 in FIG. 4, and/or the mounting system 502 in FIG. 5. Inasmuch as some components of the mounting system 502 are similar to some of those of mounting systems 104, 202, and/or 406 the reference numbers remain the same on the same parts for convenience. Here in this embodiment of FIG. 6, the mounting bracket 610 may be a trim skirt mount assembly for attaching a skirt 410 (illustrated in the third perspective view 404). Similar to bracket 408, the mounting bracket 610 may include the plurality of notches 418 for attaching to the skirt 410. The mounting bracket 610 may include a stanchion 612, whereat the plurality of notches 418 are located, and a coupling member 614 that is not integrally formed with the stanchion 612. The stanchion 612 may extend in an L-shape, such that a vertical portion 616 of the L-shape includes the plurality of notches 418 along with the slot 422 to which other components may be secured. Further, a horizontal portion 618 of the L-shape may extend transverse to the vertical portion 616 so as to align with an upper surface 620 of the slide portion 108. The coupling member 614 may have a C-shape such that the closed inner side of the C-shape accommodates a size and shape of the upper surface 620 of the slide portion 108 and the horizontal portion 618 of the stanchion 612. Further, the coupling member 614 may include one or more cooperating slide grooves 622(1) and 622(2), corresponding to the open ends of the C-shape, to wrap around and hook along and be slidably received by the one or more guide rails 216(1) and 216(2) of the slide portion 108. Moreover, one or more set screws 624(1) and 624(2) may be used to fasten the mounting bracket 610 to the one or more guide rails 216(1) and 216(2) of the slide member 108. The horizontal portion 618 of the stanchion 612 being interposed between the coupling member 614 and top surfaces of the first and second rails 216(1) and 216(2). When the screws 624(1) and 624(2) are tightened, the horizontal portion 618 is compressed against the top surfaces of the first and second rails 216(1) and 216(2). When the screws 624(1) and 624(2) are tightened, the screws 624(1) and 624(2) may be driven into a top surface of the horizontal portion 618 to compress the horizontal portion 618 against the top surfaces of the first and second rails 216(1) and 216(2). FIG. 6 illustrates the slot 422 is configured to slideably receive a fastener 626 (e.g., T-bolt) and a nut 628.

Figure 7:
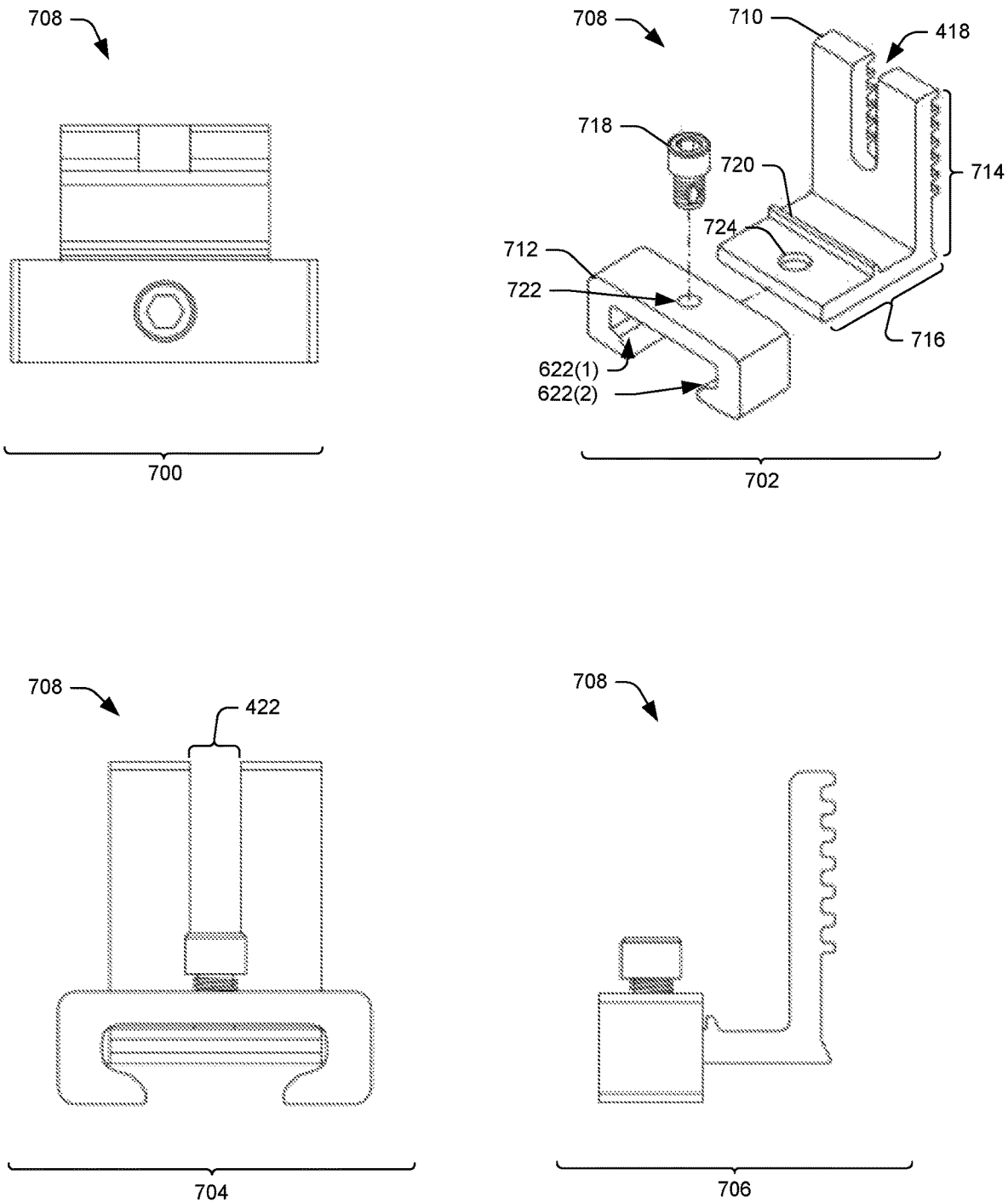
FIG. 7 illustrates a top view, an exploded perspective view, a front view, and a side view of the example bracket assembly shown in FIG. 6, according to an embodiment of this disclosure.

FIG. 7 illustrates multiple views, including a top view 700, an exploded perspective view 702, a front view 704, and a side view 706 (in order from top to bottom, left to right), of another embodiment of a mounting bracket 708 according to the instant disclosure.

The mounting bracket 708 may be similar to the mounting bracket 408 in FIG. 4, and/or the mounting bracket 610 in FIG. 6. Inasmuch as some components of the mounting bracket 708 are similar to some of those of mounting bracket 408 and mounting bracket 610 the reference numbers remain the same on the same parts for convenience. Here in this embodiment of FIG. 7, the mounting bracket 708 may be a trim skirt mount assembly for attaching the skirt 410 (illustrated in third perspective view 404). Similar to mounting bracket 408, the mounting bracket 708 may include the plurality of notches 418 for attaching to the skirt 410. The mounting bracket 708 may include a stanchion 710, whereat the plurality of notches 418 are located, and a coupling member 712 that is not integrally formed with the stanchion 710.

Similar to stanchion 420, the stanchion 710 may extend in an L-shape, such that a vertical portion 714 of the L-shape includes the plurality of notches 418 along with the slot 422 to which other components may be secured. Further, a horizontal portion 716 of the L-shape may extend transverse to the vertical portion 714 so as to align with the upper surface 620 of the slide portion 108. The coupling member 712 may have a C-shape such that the closed inner side of the C-shape accommodates a size and shape of the upper surface 620 of the slide portion 108 and/or the horizontal portion 716 of the stanchion 710. Further, the coupling member 712 may include the cooperating slide grooves 622(1) and 622(2), corresponding to the open ends of the C-shape, to wrap around and hook along and be slidably received by the one or more guide rails 216(1) and 216(2) of the slide portion 108. Moreover, a set screw 718 may be used to fasten the mounting bracket 708 to the one or more guide rails 216(1) and 216(2) of the slide portion 108.

The mounting bracket 708 may include a protruding ridge 720 protruding from the horizontal portion 716 of the L-shape that extends parallel to the vertical portion 714 of the L-shape. The protruding ridge 720 may be disposed between an end of the horizontal portion 716 and the vertical portion 714. The protruding ridge 720 may extend completely or partially across a width of the horizontal portion 716. The protruding ridge 720 provides for aiding in positioning the coupling member 712 over the horizontal portion 716 of the L-shape so a threaded hole 722 in the coupling member 712 is centered over a flat bottomed blind hole 724 in the horizontal portion 716 of the L-shape. While FIG. 7 illustrates the hole 724 may be disposed between the protruding ridge 720 and the end of the horizontal portion 716, the protruding ridge 720 may be disposed closer to the end of the horizontal portion 716. Moreover, the protruding ridge 720 in combination with the set screw 718 threaded through the coupling member 712 and sitting in a counter-bore of the blind hole 724 of the horizontal portion 716 of the L-shape aids in keeping the stanchion 710 from pivotably rotating on top of the slide portion 108 when assembled to that slide portion 108. These features, in addition to the interface between the coupling member 712 and the stanchion 710, provide for keeping the stanchion 710 facing perpendicular to the skirt 106 and ready to receive the skirt 106 regardless of where the stanchion 710 is positioned on the slide portion 108. The horizontal portion 716 of the stanchion 710 may be interposed between the coupling member 712 and top surfaces of the first and second rails 216(1) and 216(2) of the slide portion 108. When the screw 718 is tightened, the horizontal portion 716 is compressed against the top surfaces of the first and second rails 216(1) and 216(2). When the screw 718 is tightened, the screw 718 may be driven into the blind hole 724 of the horizontal portion 716 to compress the horizontal portion 716 against the top surfaces of the first and second rails 216(1) and 216(2).

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A mounting apparatus comprising:
    a base portion configured to be mounted on a surface, and the base portion including:
        a cavity,
        a port fluidly connected to the cavity, and
        a vent fluidly connected to the cavity;
    a slide portion disposed on the base portion, the slide portion including:
        a first guide rail configured to receive a first groove of a mounting bracket, and
        a second guide rail spaced apart from the first guide rail, the second guide rail configured to receive a second groove of the mounting bracket; and
    a through-hole located between the first rail guide and the second rail guide, and through the base portion.

2. The mounting apparatus according to claim 1, wherein the slide portion further includes:
    a first end extending a distance beyond a perimeter of the base portion;
    a second end disposed on the base portion; and
    at least one of:
        a first drain opening disposed in the first end, or
        a second drain opening disposed in the second end.

3. The mounting apparatus according to claim 1, wherein the port fluidly connected to the cavity extends from a top of the base portion into the cavity within the base portion, and the vent fluidly connected to the cavity is disposed in the top of the base portion and extending to the cavity.

4. The mounting apparatus according to claim 1, the base portion further including a seal for sealing an interface between the base portion and the surface.

5. The mounting apparatus according to claim 1, wherein the slide portion further includes a channel between the first guide rail and the second guide rail, and
    wherein the through-hole is located through the channel into the base portion.

6. The mounting apparatus according to claim 1, further comprising the mounting bracket, the mounting bracket including the first groove and the second groove, and the mounting bracket for securing a rail segment to the slide portion.

7. A mounting system comprising:
    a base portion having a top portion opposite a bottom portion, the bottom portion of the base portion being configured to mount to a surface, the base portion including:
        a cavity configured to receive a sealant,
        a port extending from the top portion to the bottom portion, the port being fluidly connected to the cavity, and
        a vent extending from the top portion to the bottom portion, the vent being fluidly connected to the cavity;
    a slide portion extending from the top portion, the slide portion including one or more guide rails;
    a mounting bracket including slide grooves for slidably engaging the one or more guide rails; and
    a through-hole located through the slide portion into the base portion, the through-hole being configured to receive a fastener for securing the base portion to the surface.

8. The mounting system according to claim 7, wherein the mounting bracket is configured to secure a rail segment to the slide portion.

9. The mounting system according to claim 7, wherein the mounting bracket further includes a stanchion protruding from the slide grooves, the stanchion having a slot configured to slidably receive a fastener for securing a rail segment to the mounting bracket.

10. The mounting system according to claim 9, wherein the stanchion includes a first vertical arm and a second vertical arm, the first vertical arm and the second vertical arm define the slot configured to slidably receive the fastener, and
    wherein each of the first vertical arm and the second vertical arm include a plurality of notches for attaching to a skirt segment.

11. The mounting system according to claim 7, wherein the mounting bracket further includes:
    a vertical portion and a horizontal portion extending transverse to the vertical portion, the vertical portion including notches configured to receive a rail segment; and
    a coupling member slidably configured to receive the horizontal portion, the coupling member including slide grooves configured to engage with the one or more guide rails.

12. The mounting system according to claim 7, wherein the slide portion further includes at least one of:

a first drain opening disposed proximate a first end of the slide portion; or a second drain opening disposed proximate a second end of the slide portion opposite the first end.

13. The mounting system according to claim 7, further including a seal configured to seal an interface between the bottom portion of the base portion and the surface.

14. The mounting system according to claim 7, wherein the base portion further includes a plug configured to be received at least partially within the port.

15. The mounting system according to claim 7, wherein the port is configured to receive the sealant to fill the cavity with the sealant, thereby sealing around a penetration in the surface by a surface fastener, the sealant forcing air from inside the cavity out of the vent to ensure the sealant completely fills the cavity.

16. A mounting apparatus comprising:
 a base portion having a top surface and a bottom surface opposite the top surface the base portion including:
  a cavity formed at least in part by the bottom surface,
  a port extending between the top surface and the bottom surface, through a thickness of the base portion, and
  a vent extending between the top surface and the bottom surface, through the thickness of the base portion;
 a slide portion at least partially disposed on the top surface, at a location between the port and the vent, the slide portion having a first end and a second end, the first end being located on the top surface of the base portion, and the second end extending a distance past a perimeter of the base portion, the slide portion including one or more guide rails for slidably receiving a mounting bracket; and
 a through-hole disposed through the base portion, the through-hole being sized to receive a fastener for coupling the mounting apparatus to a surface.

17. The mounting apparatus according to claim 16, wherein the slide portion further includes:
 at least one of:
  a first drain opening proximate to the first end, or
  a second drain opening proximate the second end.

18. The mounting apparatus according to claim 16, further comprising the mounting bracket, the mounting bracket including slide grooves for slidably engaging with the one or more guide rails for securing a rail segment to the slide portion.

19. The mounting apparatus according to claim 16, the base portion further including a seal for sealing an interface between the bottom surface of the base portion and the surface to which a bottom portion of the base portion is mounted.

\* \* \* \* \*